(12) United States Patent
Narukawa et al.

(10) Patent No.: US 7,213,700 B2
(45) Date of Patent: May 8, 2007

(54) PART CARRIAGE DEVICE

(75) Inventors: Shuuichi Narukawa, Toyohashi (JP); Tetsuyuki Kimura, Ise (JP)

(73) Assignee: Shinko Electric Co., Ltd., Tokyo (JP)

( * ) Notice: Subject to any disclaimer, the term of this patent is extended or adjusted under 35 U.S.C. 154(b) by 0 days.

(21) Appl. No.: 11/369,860

(22) Filed: Mar. 8, 2006

(65) Prior Publication Data
US 2006/0201788 A1    Sep. 14, 2006

(30) Foreign Application Priority Data
Mar. 11, 2005  (JP)  ............................. 2005-069744
Mar. 30, 2005  (JP)  ............................. 2005-096823

(51) Int. Cl.
*B65G 27/08* (2006.01)
(52) U.S. Cl. ...................... 198/763; 198/766
(58) Field of Classification Search ............... 198/758, 198/759, 763, 766, 769, 771
See application file for complete search history.

(56) References Cited

U.S. PATENT DOCUMENTS 4,795,025 A * 1/1989 Doke et al. ................. 198/763
5,445,261 A * 8/1995 Kimura ....................... 198/763

FOREIGN PATENT DOCUMENTS

| JP | 2-204209 | * | 8/1990 | .................. 198/763 |
| JP | 3-51210 | * | 3/1991 | .................. 198/763 |
| WO | WO 2004/067413 A1 | | 8/2004 | |

\* cited by examiner

*Primary Examiner*—James R. Bidwell
(74) *Attorney, Agent, or Firm*—Oblon, Spivak, McClelland, Maier & Neustadt, P.C.

(57) ABSTRACT

Provided is a part carriage device which can smoothly convey a part. A base part, a piezoelectric vibration part, a weight part, a vibration transmission part, a carriage way are arranged from a lowest side of a piezo-driven parts feeder in this order. In addition, a straight line L10 for connecting a barycentric position of the piezoelectric vibration part, a barycentric position of the vibration transmission part, and a barycentric position of the weight part is approximately in parallel to a carriage angle α10.

10 Claims, 14 Drawing Sheets

PART CARRIAGE DEVICE

BACKGROUND OF THE INVENTION

1. Technical Field

The present invention relates to a part carriage device which can convey a part by vibration.

2. Related Art

Conventionally, a parts feeder is widely known as a part carriage device for aligning a part and conveying the part by applying vibration to the part. This parts feeder can align the part and convey the part to a subsequent process by applying vibration to the part.

International Publication No. 2004/067413 discloses a piezo-driven parts feeder in which restricts stress acting on a vibration generator such that sufficient amplitude is achieved even in high frequency drive condition and the replacement of the vibration generator and the change and adjustment of a resonance frequency are facilitated.

However, in the conventional parts feeder, a phenomenon (hereinafter, referred to as pitching phenomenon) that the both ends of a carriage way for conveying the part vertically vibrate in opposite directions and the carriage way rotates may be generated. When the pitching phenomenon is generated, a stripe of the vibration occurs on the carriage way and thus conveyance of the part is delayed or the part is conveyed backward.

In addition, in order to suppress the pitching phenomenon, although the weight of a base part arranged at a lowest side of the parts feeder increases to reduce the pitching phenomenon, the vibration transmitted to the base part is transmitted to the lower side of the parts feeder and thus numerous problems such as noise and wear of the base part are caused.

Furthermore, in the conventional parts feeder, since the base part, a weight part, a drive part, and the carriage way are laminated in this order, the vibration direction of a board spring is opposite to a vibration direction of a vibration prevention leaf spring and thus uniform vibration cannot be conveyed in the carriage way. Hereinafter, its detailed operation will be described.

FIG. 14 is a view illustrating the vibration direction of the board spring and the vibration direction of the vibration prevention leaf spring in the conventional parts feeder 900.

As illustrated in FIG. 14, the board spring 980 for connecting the drive part 902 with the weight part 903 vibrates in a direction indicated by an arrow R1, but the vibration prevention leaf spring 990 for connecting the weight part 903 with the base part 901 vibrates in a direction indicated by an arrow R11, that is, the board spring 980 and the vibration prevention leaf spring 990 vibrate in opposite directions. As a result, the vibration is not uniform in the carriage way 905 and the conveyance of the part stops or the part is conveyed backward.

SUMMARY OF THE INVENTION

An object of the present invention is to provide a part carriage device which can smoothly convey a part.

Another object of the present invention is to provide a part carriage device which can smoothly convey a part and suppress vibration applied to the lower side of the part carriage device.

Another object of the present invention is to provide a part carriage device which can smoothly convey a part by equalizing vibration directions of a support member and a vibration prevention member to each other.

(1)

According to a first aspect of the present invention, there is provided a part carriage device for applying vibration generated at a vibration body to a part and linearly conveying the part, including a base part which is disposed at a lowest side of the part carriage device; a first drive part which is arranged above the base part through a vibration prevention member; a weight part which is arranged above the first drive part through a support member and the vibration body; a second drive part which is arranged above the weight part through a connection member connected to the first drive part; and a carriage way which is arranged above the second drive part and conveys the part in a horizontal direction, wherein a straight line for connecting a total barycentric position, which is a sum of a barycentric position of the first drive part, a barycentric position of the second drive part, and a barycentric position of the carriage way, with a barycentric position of the weight part is approximately parallel to an angle for applying the vibration to the part.

In the part carriage device according to the first aspect, the base part, the first drive part, the weight part, the second drive part, and the carriage way are arranged from a lowest side of the part carriage device in this order. In addition, a straight line for connecting the barycentric position of the first drive part and the second drive part with the barycentric position of the weight part is approximately in parallel to an angle for applying the vibration to the part. Moreover, the weight part may include a vibration spindle or a balance weight.

In this case, since the first drive part and the second drive part are separated from each other through the weight part in the vertical direction, the total barycentric position which is the sum of the barycentric position of the first drive part, the barycentric position of the second drive part, and the barycentric position of the carriage way can be close to the barycentric position of the weight part.

In addition, since the total barycentric position is close to the barycentric position of the weight part, it is possible to approximately equalize the straight line for connecting the barycentric positions with each other to the angle for applying the vibration to the part. Moreover, although the weight of the base part does not increase, it is possible to suppress a pitching phenomenon of the carriage way, and thus it is possible to smoothly convey the part and to suppress the vibration from being applied to the lower side of the part carriage device.

(2)

The first drive part may further include a weight adjustment part which can change the barycentric position of the first drive part.

In this case, since the barycentric position of the first drive part can be easily changed, it is possible to easily change the total barycentric position which is the sum of the barycentric position of the first drive part, the barycentric position of the second drive part, and the barycentric position of the carriage way. As a result, it is possible to easily arrange the straight line for connecting the total barycentric position with the barycentric position of the weight part approximately in parallel to the angle for applying the vibration to the part.

(3)

The second drive part may further include a weight adjustment part which can change the barycentric position of the second drive part.

In this case, since the barycentric position of the second drive part can be easily changed, it is possible to easily change the total barycentric position which is the sum of the barycentric position of the first drive part, the barycentric position of the second drive part, and the barycentric position of the carriage way. As a result, it is possible to easily arrange the straight line for connecting the total barycentric position with the barycentric position of the weight part approximately parallel to the angle for applying the vibration to the part.

(4)

A rigidity value of the vibration prevention member may be extremely smaller than that of the support member. In the conventional part carriage device, although the mass of the base part increases to extremely reduce the rigidity of the vibration prevention member, the vibration is not adequately transmitted to the carriage way and thus the part cannot be smoothly conveyed. However, in this case, since pitching vibration does not occur, the vibration in horizontal vertical directions which becomes a reaction force transmitted to the base part can be reduced. Accordingly, it is possible to reduce the mass of the base part and to smoothly convey the part on the carriage way.

(5)

According to a second aspect of the present invention, there is provided a part carriage device for applying vibration generated at a vibration body to a part and linearly conveying the part, including a base part which is disposed at a lowest side of the part carnage device; a first weight part which is arranged above the base part through a vibration prevention member; a drive part which is arranged above the first weight part through a support member and the vibration body; a second weight part which is arranged through a connection member connected to the first weight part; and a carriage way which conveys the part in a horizontal direction, wherein a straight line for connecting a total barycentric position which is a sum of a barycentric position of the first weight part and a barycentric position of the second weight part with a total barycentric position which is a sum of a barycentric position of the drive part and a barycentric position of the carriage way is approximately parallel to an angle for applying the vibration to the part.

In the part carriage device according to the second aspect, the base part, the first weight part, the drive part, and the carriage way are arranged from a lowest side of the part carriage device in this order. The second weight part is disposed at least above the first weight part through the connection member. In addition, a straight line for connecting the total barycentric position which is the sum of the barycentric position of the first weight part and the barycentric position of the second weight part with the total barycentric position which is the sum of the barycentric position of the drive part and the barycentric position of the carriage way is approximately parallel to an angle for applying the vibration to the part.

In this case, since the first weight part and the second weight part are separated from each other in the vertical direction, the total barycentric position which is the sum of the barycentric position of the first weight part and the barycentric position of the second weight part can be close to the total barycentric position which is the sum of the barycentric position of the drive part and the barycentric position of the carriage way.

In addition, since the total barycentric position which is the sum of the barycentric position of the first weight part and the barycentric position of the second weight part is close to the total barycentric position which is the sum of the barycentric position of the drive part and the barycentric position of the carriage way, it is possible to approximately equalize the straight line for connecting the barycentric positions with each other to the angle for applying the vibration to the part. Moreover, although the weight of the base part does not increase, it is possible to suppress a pitching phenomenon of the carriage way, and thus it is possible to smoothly convey the part and to suppress the vibration from being applied to the lower side of the part carriage device.

(6)

The second weight part may be provided above the carriage way.

In this case, the total barycentric position of the first weight part and the second weight part moves upward in the part carriage device. As a result, since the total barycentric position of the first weight part and the second weight part can be close to the total barycentric position of the drive part and the carriage way, it is possible to easily arrange the straight line for connecting the barycentric positions with each other approximately parallel to the angle for applying the vibration to the part.

(7)

The second weight part may be provided at the lateral side of the carriage way. In this case, since the total barycentric position of the first weight part and the second weight part can be close to the total barycentric position of the drive part and the carriage way by the second weight part and the connection member, it is possible to easily arrange the straight line for connecting the barycentric positions with each other approximately parallel to the angle for applying the vibration to the part.

(8)

A rigidity value of the vibration prevention member may be smaller than that of the support member. In this case, since a reaction force transmitted to the base part can be reduced, it is possible to reduce the mass of the base part. As a result, it is possible to suppress the vibration from being transmitted to the bottom of the part carriage device.

(9)

According to a third aspect of the present invention, there is provided a part carriage device for applying vibration generated at a vibration body to a part and linearly conveying the part, including a base part which is disposed at a lowest side of the part carriage device; and a vibration exciter which is arranged above the base part through a vibration prevention member, wherein the lower end of the vibration exciter is suspend downward by the upper end of the base part using the vibration prevention member.

In the part carriage device according to the third aspect, the base part is disposed at the lowest side of the part carriage device and the vibration exciter is arranged above the base part through the vibration prevention member. The lower end of the vibration exciter is suspended from the upper end of the base part using the vibration prevention member.

In this case, it is possible to change the vibration directions which were conventionally opposite to each other and to equalize the vibration direction of the vibration exciter and the lower end of the vibration exciter suspended by the base part to each other. As a result, since stable vibration can be conveyed to the part, it is possible to smoothly convey the part.

(10)

The vibration exciter may include a first drive part which is arranged above the base part through the vibration prevention member; a weight part which is arranged above the first drive part through a support member and the vibration body; a second drive part which is arranged above the weight part through a connection member connected to the first drive part; and a carriage way which is arranged above the second drive part and conveys the part in a horizontal direction, wherein the lower end of the first drive part is suspended downward by the upper end of the base part using the vibration prevention member, and the upper end of the first drive part is suspended downward by the lower end of the weight part using the support member.

In this case, it is possible to equalize the vibration direction of the support member to the vibration direction of the vibration prevention member. In addition, since the first drive part and the second drive part are separated from each other in the vertical direction, the total barycentric position which is the sum of the barycentric position of the first drive part, the barycentric position of the second drive part, the barycentric position of the carriage way can be close to the barycentric position of the weight part (vibration spindle) and thus it is possible to easily equalize the straight lien for connecting the barycentric positions with each other to the angle for applying the vibration to the part. As a result, since adequate vibration can be applied to the carriage way, it is possible to more smoothly convey the part and to suppress the vibration from being applied to the lower side of the part carriage device by preventing the pitching phenomenon.

(11)

The vibration exciter may include a weight part; and a drive part which is arranged above the weight part through a support member and the vibration body, wherein the upper end of the weight part is suspended downward by the lower end of the drive part using the support member, and the lower end of the weight part is suspended downward by the upper end of the base part using the vibration prevention member.

In this case, it is possible to equalize the vibration direction of the support member to the vibration direction of the vibration prevention member. As a result, since adequate vibration can be applied to the carriage way, it is possible to smoothly convey the part.

BRIEF DESCRIPTION OF THE DRAWINGS

The invention will be described with reference to the accompanying drawings, wherein like numbers reference like elements, and wherein.

DESCRIPTION OF THE EMBODIMENTS

Hereinafter, a part carriage device according to embodiments of the present invention will be described. In the below-mentioned embodiments, for example, a piezo-driven parts feeder 300 will be described.

(First Embodiment)

Figure 1:
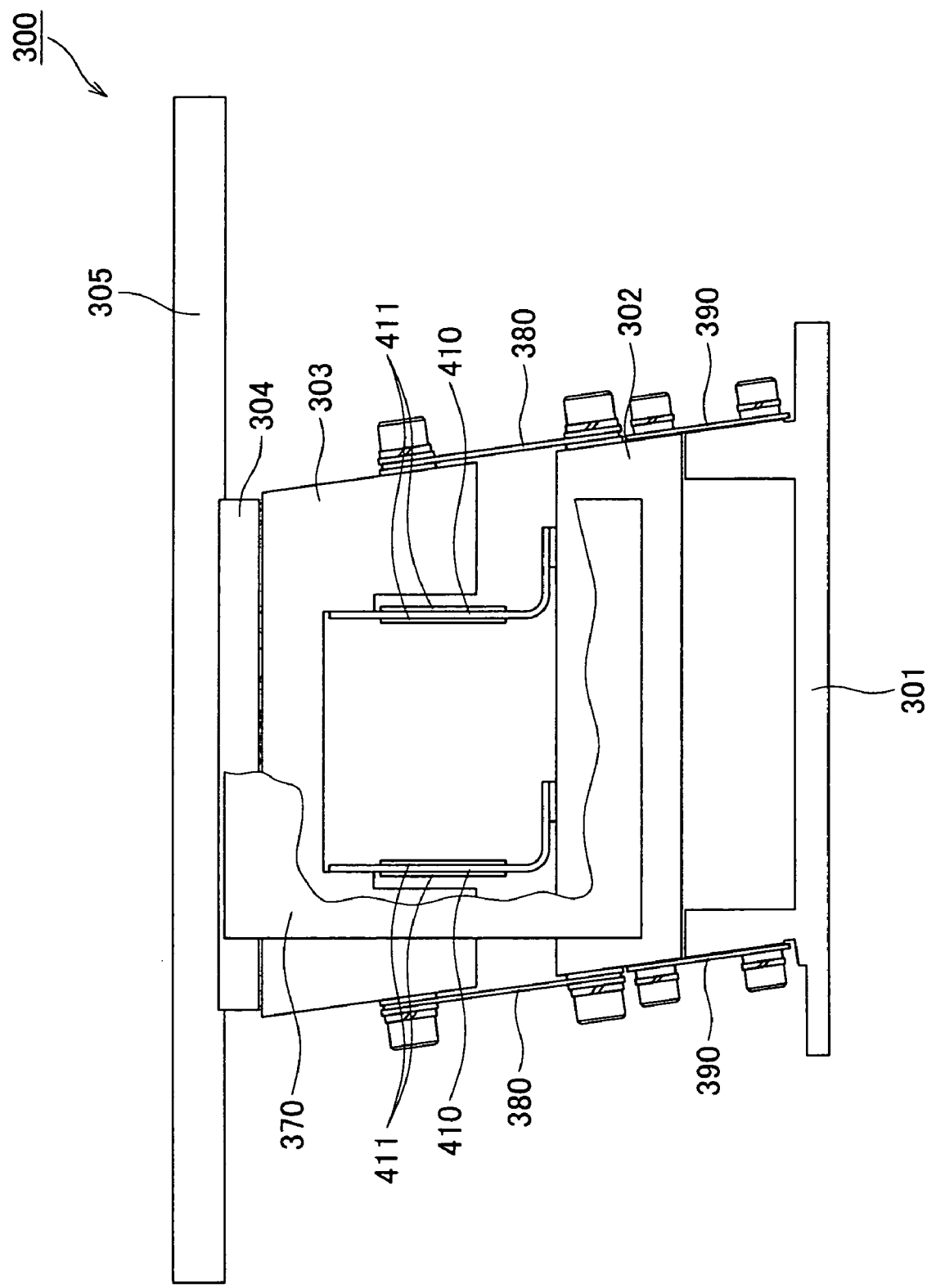
FIG. 1 is a side view illustrating an example of a piezo-driven parts feeder according to a first embodiment of the present invention.

FIG. 1 is a side view illustrating an example of a piezo-driven parts feeder according to a first embodiment of the present invention.

The piezo-driven parts feeder 300 includes a base part 301, a piezoelectric vibration part 302, a weight part 303, a vibration transmission part 304, a carriage way 305, a connection board 370 (of which a portion is omitted), board springs 380, and vibration prevention leaf springs 390.

As illustrated in FIG. 1, the piezoelectric vibration part 302 is held above the base part 301 by the plurality of vibration prevention leaf springs 390. The weight part 303 is held above the piezoelectric vibration part 302 by the plurality of board springs 380.

In addition, as illustrated in FIG. 1, an L-shaped elasticity member 410 formed by bending a flat plate is provided in the piezoelectric vibration part 302 and the weight part 303. One end of the elasticity member 410 is fixed to the weight part 303 and the other end thereof is fixed to the piezoelectric vibration part 302.

Furthermore, piezoelectric elements 411 are arranged on both surfaces of the elasticity member 410. A spring constant composed of the elasticity member 410 and the piezoelectric elements 411 is adequately selected depending on any resonance frequency condition determined by the weight of the carriage way 305 and the weight and the size of the conveyed part.

In the piezoelectric elements 411 of FIG. 1, piezoelectric ceramic is subjected to a polarization process, the piezoelectric ceramic having a plus polarization potential is attached to one surface of the elasticity member 410 and the piezoelectric ceramic having a minus polarization potential is attached to the other surface of the elasticity member 410. To this end, a bimorph structure is formed on the front and rear surfaces of the elasticity member 410 by the piezoelectric elements 411. Vibration is generated by applying charges to the piezoelectric element 411 and thus the weight part 303 and the piezoelectric vibration part 302 vibrate.

Subsequently, the vibration transmission part 304 is provided above the weight part 303. The vibration transmission part 304 is fixed by the connection board 370 connected to the piezoelectric vibration part 302. In other words, the vibration transmission part 304 moves in synchronization with the vibration of the piezoelectric vibration part 302. The detailed operation of the vibration transmission part 304 will be described later.

In addition, the carriage way 305 is provided above the vibration transmission part 304. By applying the vibration to the carriage way 305, a part moves in a carriage hole provided in the carriage way 305.

Next, with reference to the drawings, the operation of the piezo-driven parts feeder 300 will be described in comparison with the conventional piezo-driven parts feeder.

Figure 2:
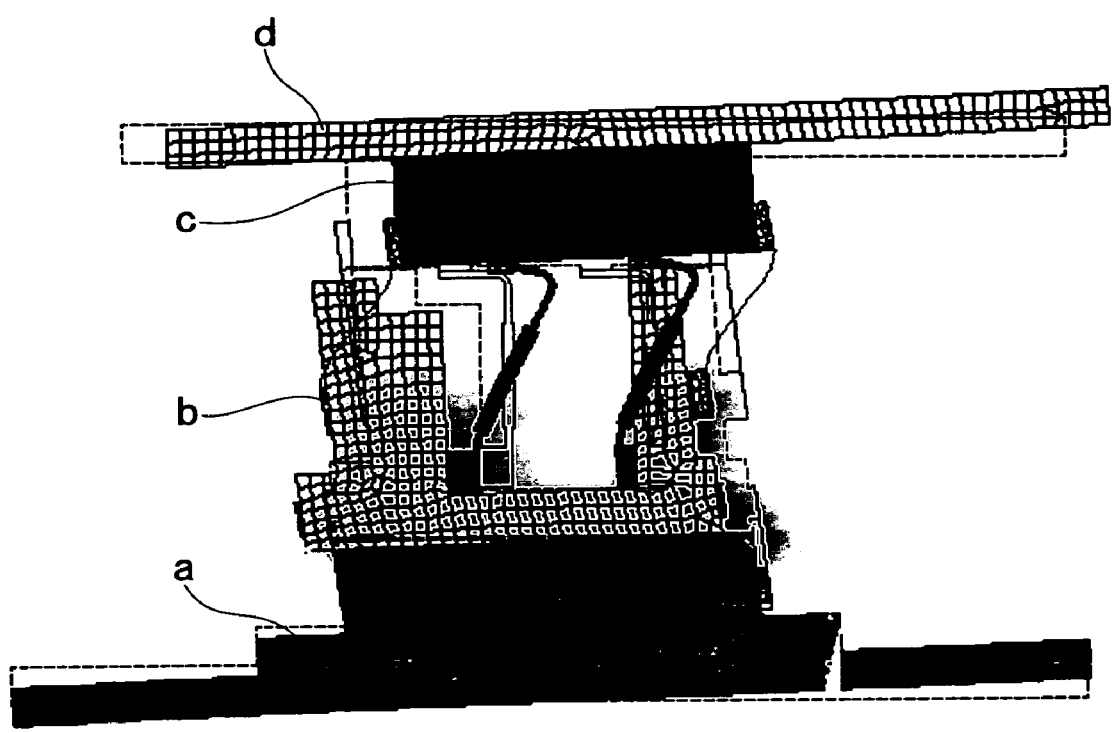
FIG. 2 illustrates simulation of a vibration state of a conventional piezo-driven parts feeder.
Figure 3:
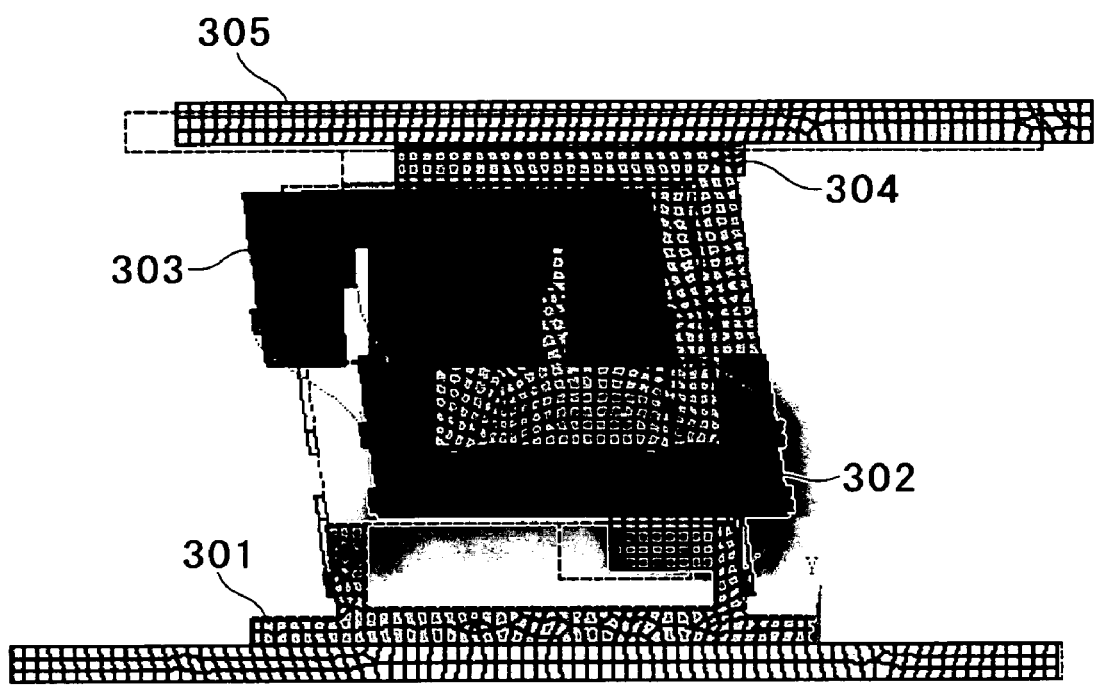
FIG. 3 illustrates simulation of an operation state of a piezo-driven parts feeder according to the present invention.

FIG. 2 illustrates simulation of a vibration state of the conventional piezo-driven parts feeder, and FIG. 3 illustrates simulation of an operation state of a piezo-driven parts feeder according to the present embodiment.

In general, a characteristic frequency f of the piezo-driven parts feeder of FIG. 2 or 3 can be obtained by the following Equation 1 using a sum k1 of spring constants of the elasticity member 410, the piezoelectric element 411, and the board spring 380 and an equivalent mass M of the piezoelectric vibration part 302, the weight part 303, and the vibration transmission part 304. In addition, the spring constant of the vibration prevention leaf spring 390 is extremely smaller than k1.

Equation 1

$$f = \frac{1}{2\pi} \times [(k1)/M]^{1/2} \quad (1)$$

Furthermore, the equivalent mass M of the piezo-driven parts feeder in Equation 1 can be obtained by the following Equation 2.

Equation 2

$$M = (m1 \times m2)/(m1 + m2) \quad (2)$$

In the piezo-driven parts feeder 300 according to the present embodiment, m1 of Equation 2 denotes the mass of the piezoelectric vibration part 302, the vibration transmission part 304, the carriage way 305, and the connection board 370, and m2 denotes the mass of the weight part 303.

Meanwhile, in the conventional piezo-driven parts feeder, as illustrated in FIG. 2, m1 denotes the mass of the weight part b and m2 denotes the mass of the drive part c. The piezoelectric element vibrates by the characteristic frequency f extracted as mentioned above and thus each piezo-driven parts feeder vibrates.

As illustrated in FIG. 2, in the conventional piezo-driven parts feeder which is resonated at the characteristic frequency f, one end of the carriage way d moves upward, the other end thereof moves downward, and the carriage way d itself rotates, thereby generating the so-called pitching phenomenon. By generating the pitching phenomenon, a stripe of vibration occurs in the carriage way d, and thus a part stops in the carriage way d and is conveyed backward.

In addition, in the conventional piezo-driven parts feeder, one end of the base part a moves downward and the other end of the base part a moves upward, by the pitching phenomenon. In other words, large vibration is generated with respect to the lower surface of the base part a.

Meanwhile, as illustrated in FIG. 3, when the piezo-driven parts feeder 300 according to the present embodiment is driven, one end of the carriage way 305 moves upward and the other end thereof moves upward. In other words, the carriage way 305 integrally moves in a vertical direction approximately in parallel and thus the pitching phenomenon does not occur. Furthermore, in the piezo-driven parts feeder 300 according to the present embodiment, since the pitching phenomenon does not occurs, the lower surface of the base part 301 hardly vibrates and thus large vibration is not generated.

Figure 4:
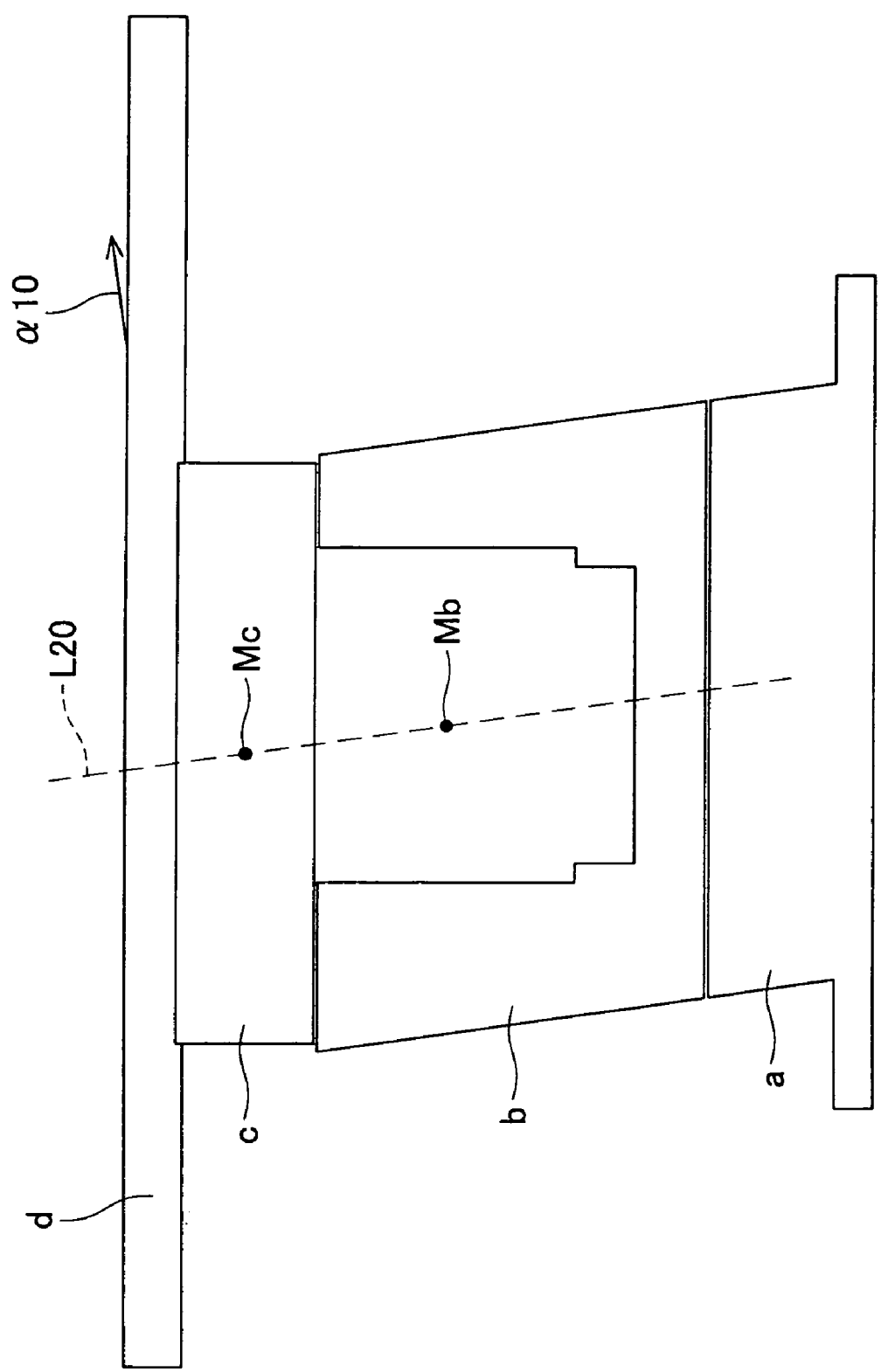
FIG. 4 is a view illustrating the conventional piezo-driven parts feeder.

Next, the pitching phenomenon in FIGS. 2 and 3 will be described. FIG. 4 is a view illustrating the conventional piezo-driven parts feeder, and FIG. 5 is a view illustrating the piezo-driven parts feeder 300.

The piezo-driven parts feeder illustrated in FIG. 4 includes a base part a, a weight part b, a drive part c, and a carriage part d. In this case, a straight line L20 which connects a barycentric position Mb of the weight part b with a barycentric position Mc of the drive part c is not arranged approximately in parallel to a carriage angle α10 of the part. In this case, the vibration applied to the carriage way d is generated by changing the vibration direction of the straight line L20 by the board spring 380. In other words, since a load is applied by changing the vibration direction by the board spring 380, the vibration cannot be applied approximately in parallel to the carriage angle α10, thereby generating the pitching phenomenon.

Figure 5:
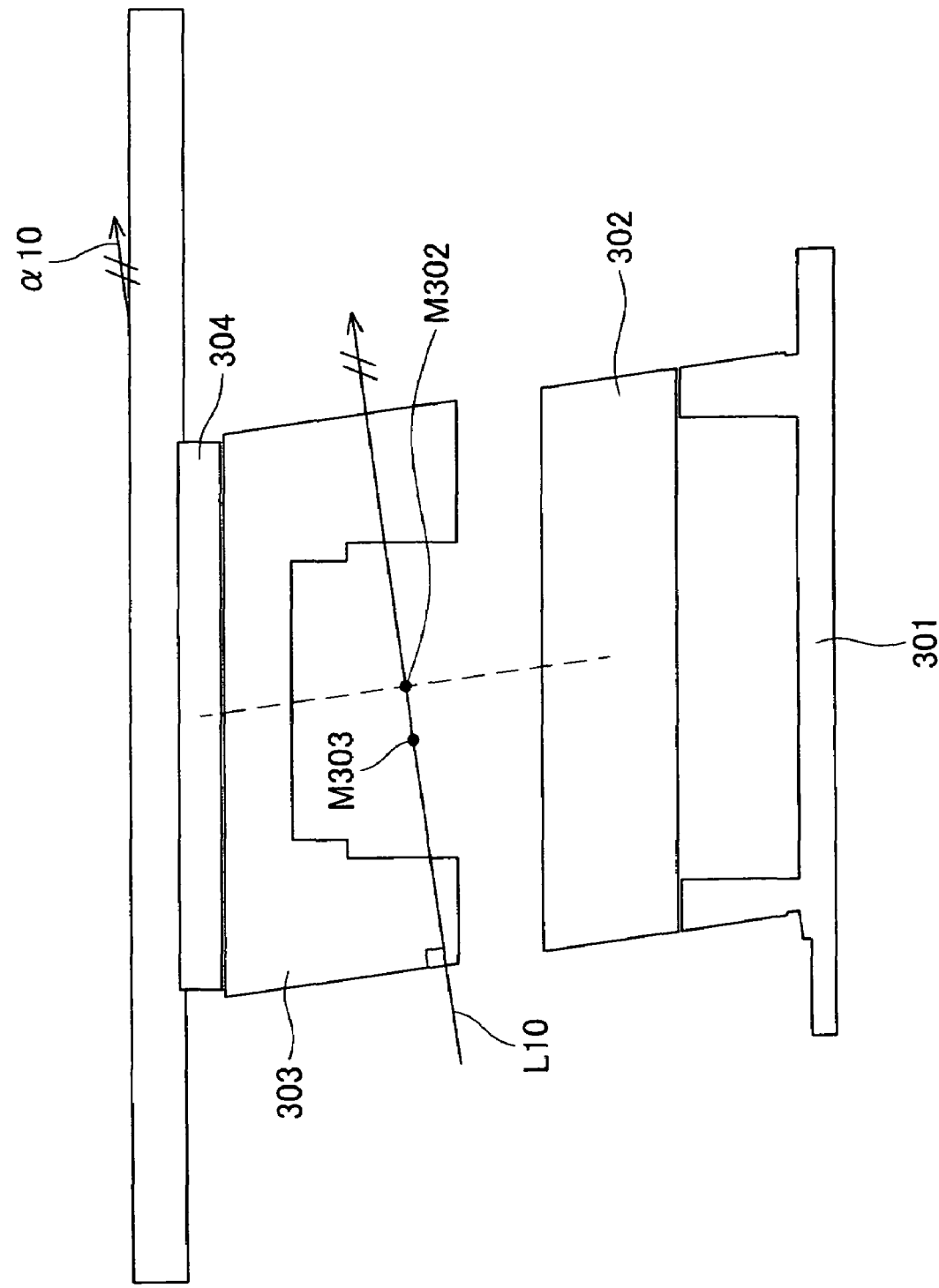
FIG. 5 is a view illustrating a piezo-driven parts feeder.

Meanwhile, in the base part 301, the piezoelectric vibration part 302, the weight part 303, the vibration transmission part 304, and the carriage way 305, which configure the piezo-driven parts feeder illustrated in FIG. 5, the piezoelectric vibration part 302 and the vibration transmission 304 are integrally formed by the connection board 370 and move one direction (left direction) in the same phase, and the weight part 303 moves in the other direction (right direction) in an opposite phase. This is because a straight line L10 which connects a total barycentric position M302 of the piezoelectric vibration part 302, the vibration transmission part 304, and the carriage way 305 with a barycentric position M303 of the weight part 303 is approximately in parallel to carriage angle α10 of the part and these parts move in balance. Accordingly, the vibration direction need not be greatly changed by the board spring 380 and thus the carriage way 305 can vibrate approximately in parallel to the carriage angle α10 of the part. As a result, the part can smoothly be conveyed.

Furthermore, in the piezo-driven parts feeder 300 illustrated in FIG. 5, since the pitching phenomenon can be prevented, the mass of the base part 301 can be reduced.

As mentioned above, in the piezo-driven parts feeder 300 according to the first embodiment, since the piezoelectric vibration part 302 and the vibration transmission part 304 are separated from each other through the weight part in the vertical direction, the total barycentric position M302 of the piezoelectric vibration part 302, the vibration transmission part 304, and the carriage way 305 can be close to the barycentric position M303 of the weight part 303. As a result, it is possible to equalize the straight line L10 which connects the barycentric position M302 with the barycentric position M303 to the angle α10 for applying the vibration to the part.

In addition, it is possible to reduce the vibration transmitted to the base part 301 and to reduce the mass of the base part 301. As a result, it is possible to suppress the vibration from being transmitted to the lower side of the piezo-driven parts feeder 300.

(Second Embodiment)

Figure 6:
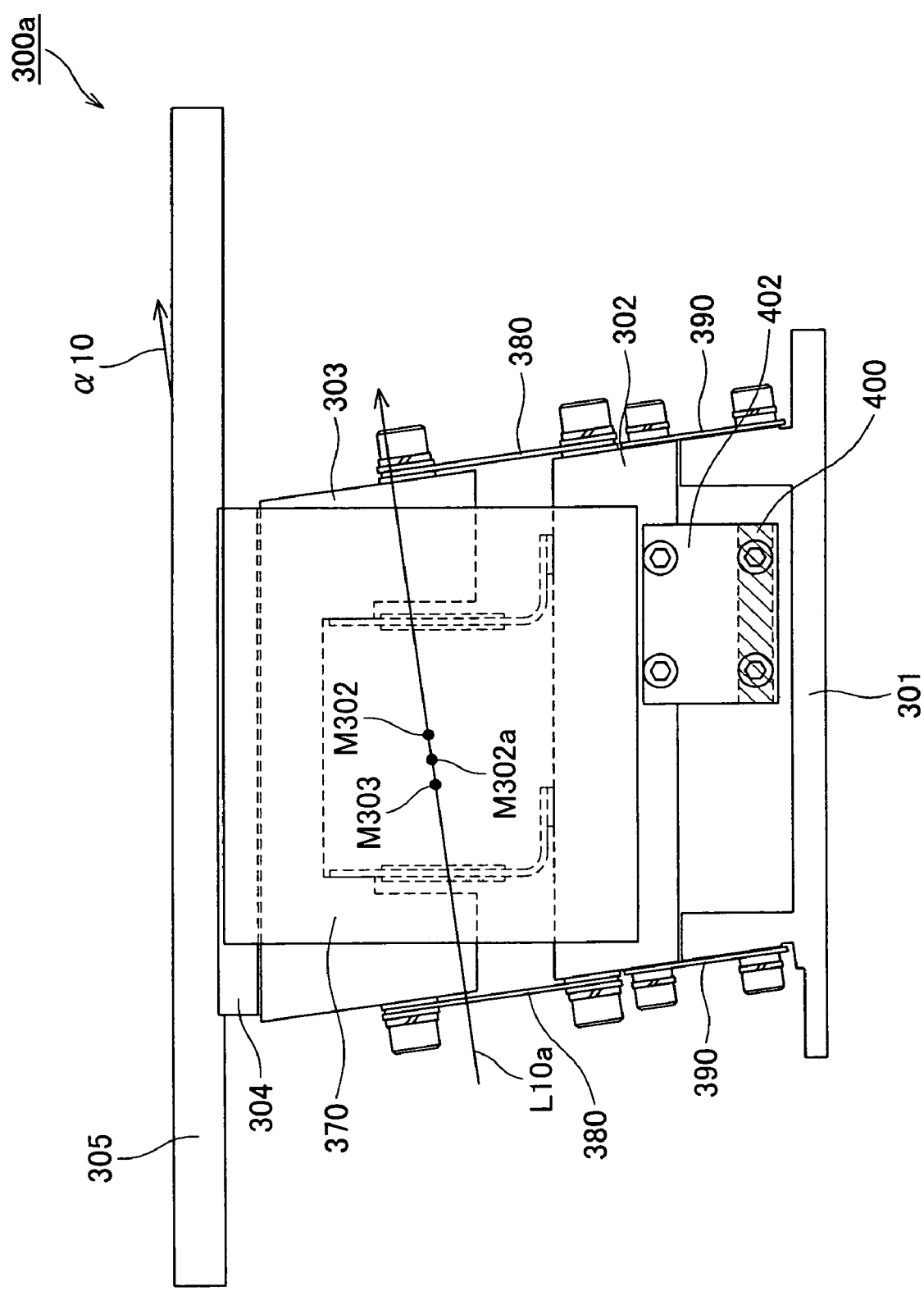
FIG. 6 is a view illustrating an example of a piezo-driven parts feeder according to a second embodiment.

Hereinafter, a piezo-driven parts feeder 300a according to a second embodiment will be described. FIG. 6 is a view illustrating an example of the piezo-driven parts feeder 300a according to the second embodiment.

A difference between the piezo-driven parts feeder 300a according to the second embodiment and the piezo-driven parts feeder 300 according to the first embodiment is as follows. The piezo-driven parts feeder 300a includes a spindle 400 and a pair of elasticity members 402 provided on the lower surface of the piezoelectric vibration part 302 according to the first embodiment.

In the lower surface of the piezoelectric vibration part 302 of the piezo-driven parts feeder 300a, a plurality of screw holes for attaching the pair of elasticity members 402 is provided and the pair of elasticity members 402 is fixed to the screw holes disposed at optimal positions by screws. In addition, the spindle 400 is provided with screw holes for attaching the pair of elasticity members 402 and the spindle 400 is fixed to the screw holes disposed at optimal positions by screws.

As mentioned above, in the piezo-driven parts feeder 300a, the total barycentric position M302 of the piezoelectric vibration part 302, the vibration transmission part 304, and the carriage way 305 can be changed to a barycentric position M302a. As a result, the barycentric position M302a can be more close to the barycentric position M303.

In addition, although, in the present embodiment, the spindle 400 is fixed using the pair of the elasticity members 402, the present invention is not limited to this. The spindle 400 may be directly fixed to the lower surface of the piezoelectric vibration part 302.

Furthermore, a reason why the barycentric position is adjusted is because rigidity of the vibration prevention leaf spring 390 can be reduced by adjusting the vibration of the carriage way 305 to adequate vibration and thus the vibration can be suppressed from being transmitted to the base part 301.

Furthermore, it is possible to more easily equalize the straight line $L10a$ which connects the barycentric position M302a with the barycentric position M303 to the carriage angle $\alpha 10$ of the part. As a result, it is possible to prevent the pitching phenomenon and to smoothly convey the part.

Moreover, it is possible to reduce the vibration transmitted to the base part 301 and to reduce the mass of the base part 301. As a result, it is possible to more suppress the vibration from being transmitted to the lower side of the piezo-driven parts feeder 300a.

(Third Embodiment)

Figure 7:
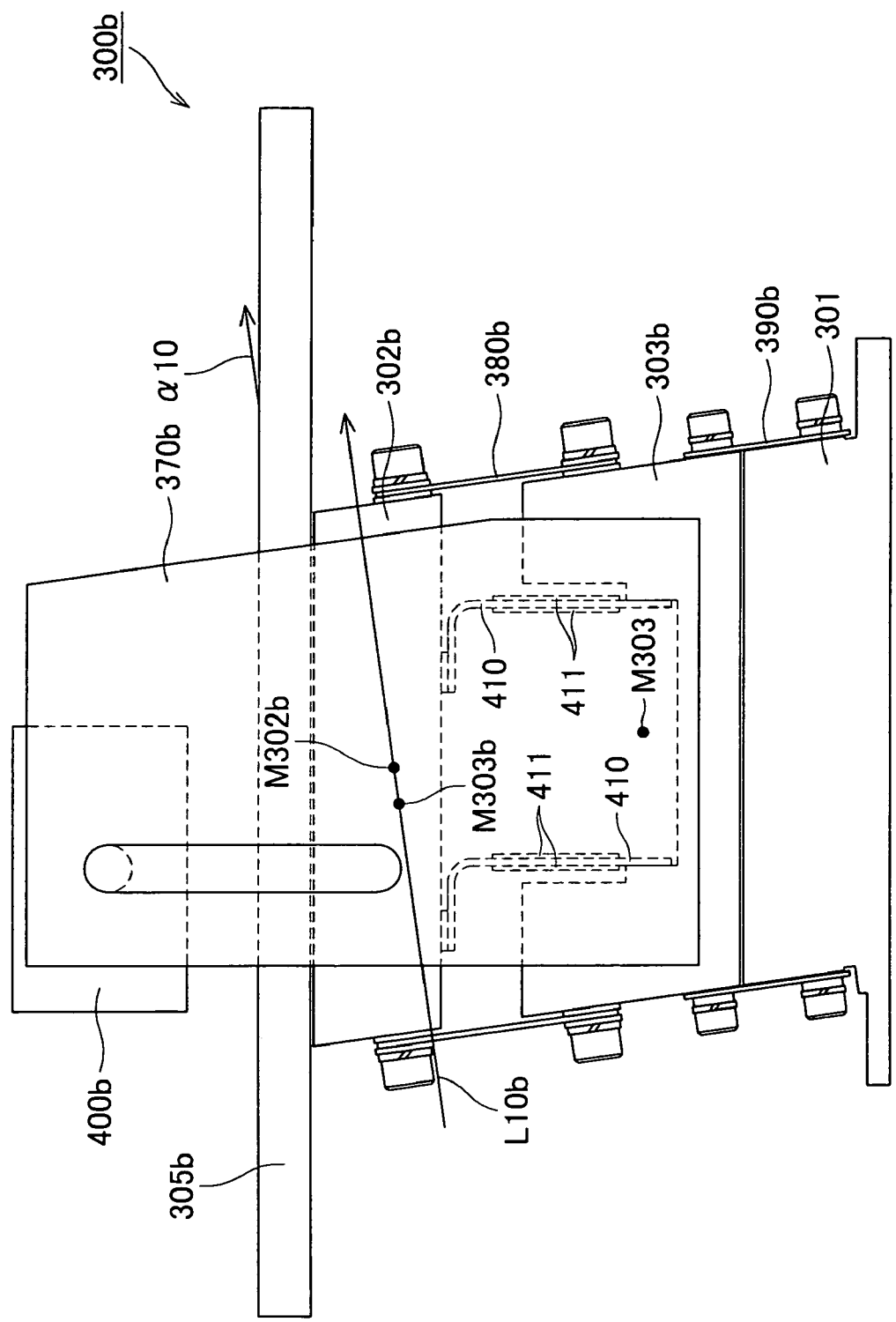
FIG. 7 is a view illustrating an example of a piezo-driven parts feeder according to a third embodiment.

Hereinafter, a piezo-driven parts feeder 300b according to a third embodiment will be described. FIG. 7 is a view illustrating an example of the piezo-driven parts feeder 300b according to the third embodiment.

As illustrated in FIG. 7, a weight part 303b is held above the base part 301 by a plurality of vibration prevention leaf spring 390b. A piezoelectric vibration part 302b is held above the weight part 303b by a plurality of board springs 380b.

In addition, as illustrated in FIG. 7, an L-shaped elasticity member 410 formed by bending a flat plate is provided in the piezoelectric vibration part 302b and the weight part 303b. One end of the elasticity member 410 is fixed to the weight part 303b and the other end thereof is fixed to the piezoelectric vibration part 302b.

The elasticity member 410 and the piezoelectric element 411 are the same configurations as those of the piezo-driven parts feeder 300 according to the first embodiment.

Subsequently, a carriage way 305b is provided above the upper surface of the piezoelectric vibration part 302b. Furthermore, a spindle 400b is provided above the carriage way 305b. This spindle 400b is held by a connection board 370b attached to the weight part 303b.

In this case, the spindle 400b and the weight part 303b move in the same phase. As a result, a total barycentric position M303b of the spindle 400b and the weight part 302b can move higher than a barycentric position M303 of the weight part 303b and thus can be close to a total barycentric position M302b of the piezoelectric vibration part 302b and the carriage way 305.

Accordingly, it is possible to approximately equalize a straight line $L10b$ which connects the barycentric position M302b of the piezoelectric vibration part 302b with the total barycentric position M303b of the weight part 303b and the spindle 400 to the carriage angle $\alpha 10$ of the part.

It is possible to more easily equalize the straight line $L10b$ which connects the barycentric position M302b with the barycentric position M303b to the carriage angle $\alpha 10$ of the part. As a result, it is possible to prevent the pitching phenomenon and to smoothly convey the part.

Moreover, it is possible to reduce the vibration transmitted to the base part 301 and to reduce the mass of the base part 301. As a result, it is possible to more suppress the vibration from being transmitted to the lower side of the piezo-driven parts feeder 300b.

(Fourth Embodiment)

Figure 8:
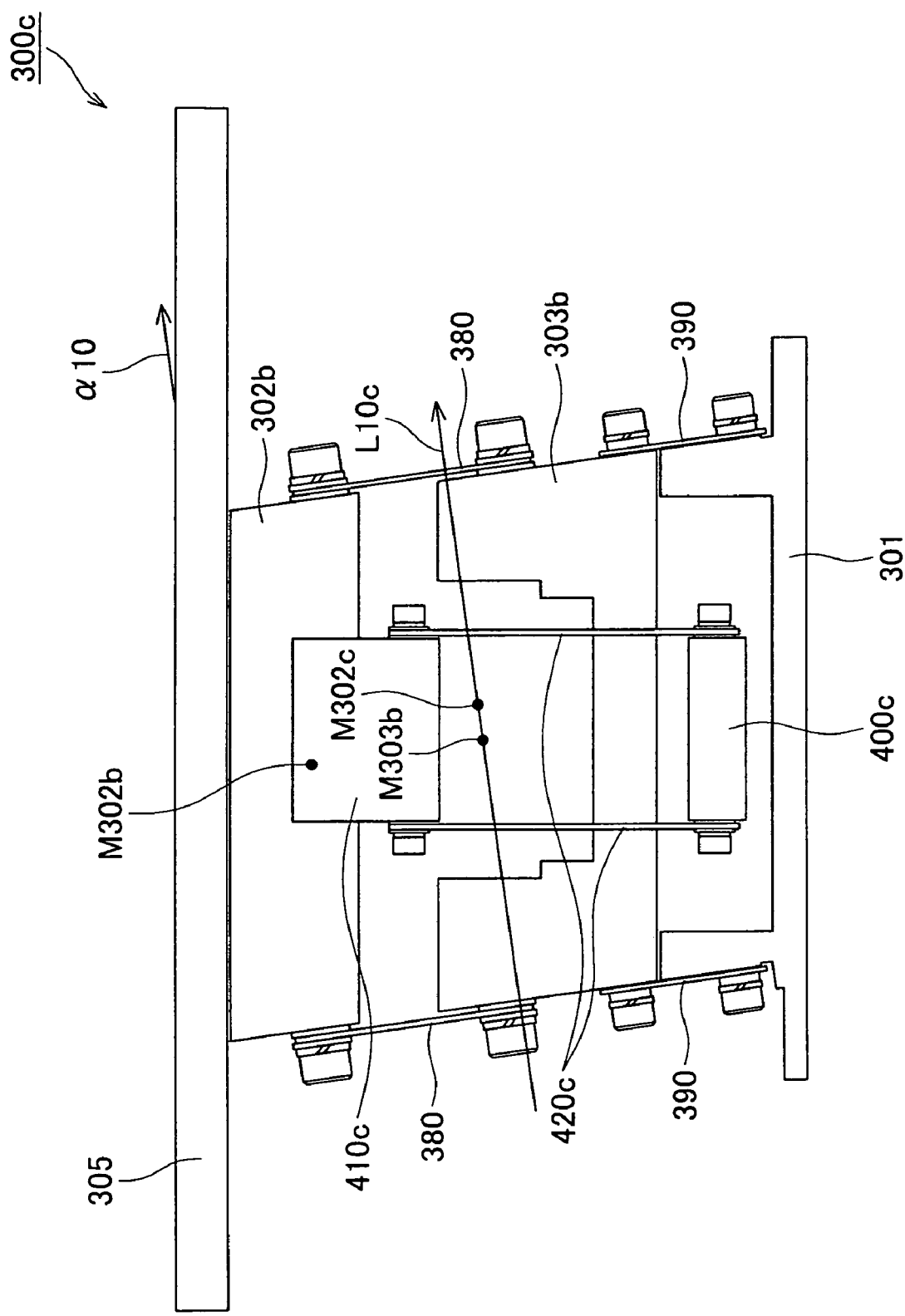
FIG. 8 is a view illustrating an example of a piezo-driven parts feeder according to a fourth embodiment.

Hereinafter, a piezo-driven parts feeder 300c according to a fourth embodiment will be described. FIG. 8 is a view illustrating an example of the piezo-driven parts feeder 300c according to the fourth embodiment.

A difference between the piezo-driven parts feeder 300c according to the fourth embodiment and the piezo-driven parts feeder 300b according to the third embodiment is as follows.

The piezo-driven parts feeder 300c includes a spindle 400c, a pair of elasticity members 420c, and an attachment member 410c, instead of the spindle 400b, and the connection 370b according to the third embodiment.

As illustrated in FIG. 8, the attachment member 410c is arranged on the piezoelectric vibration part 302b, the pair of elasticity members 420c extends from the both ends of the attachment member to the lower side thereof, and the spindle 400c is arranged on the lower ends of the elasticity members 420c.

In this case, even when the pitching phenomenon is generated, since the spindle 400c performs a pendulum operation through the elasticity members 420c in the opposite phase of the pitching phenomenon, the pitching phenomenon can be canceled.

In addition, a barycentric position of the piezoelectric vibration part 302b can be changed to a total barycentric position M302c of the spindle 400c and the piezoelectric vibration part 302b. As a result, the barycentric position M302b is changed to the barycentric position M302c to be close to a barycentric position M303b of the weight part 303b.

As a result, it is possible to equalize a straight line $L10c$ which connects the total barycentric position M302c of the carriage way 305, the piezoelectric vibration part 302b, and the spindle 400c with the barycentric position M303b of the weight part 303b to the carriage angle $\alpha 10$ of the part. Accordingly, it is possible to prevent the pitching phenomenon and to smoothly convey the part.

Moreover, it is possible to reduce the vibration transmitted to the base part 301 and to reduce the mass of the base part 301. As a result, it is possible to suppress the vibration from being transmitted to the lower side of the piezo-driven parts feeder 300c.

(Fifth Embodiment)

Figure 9:
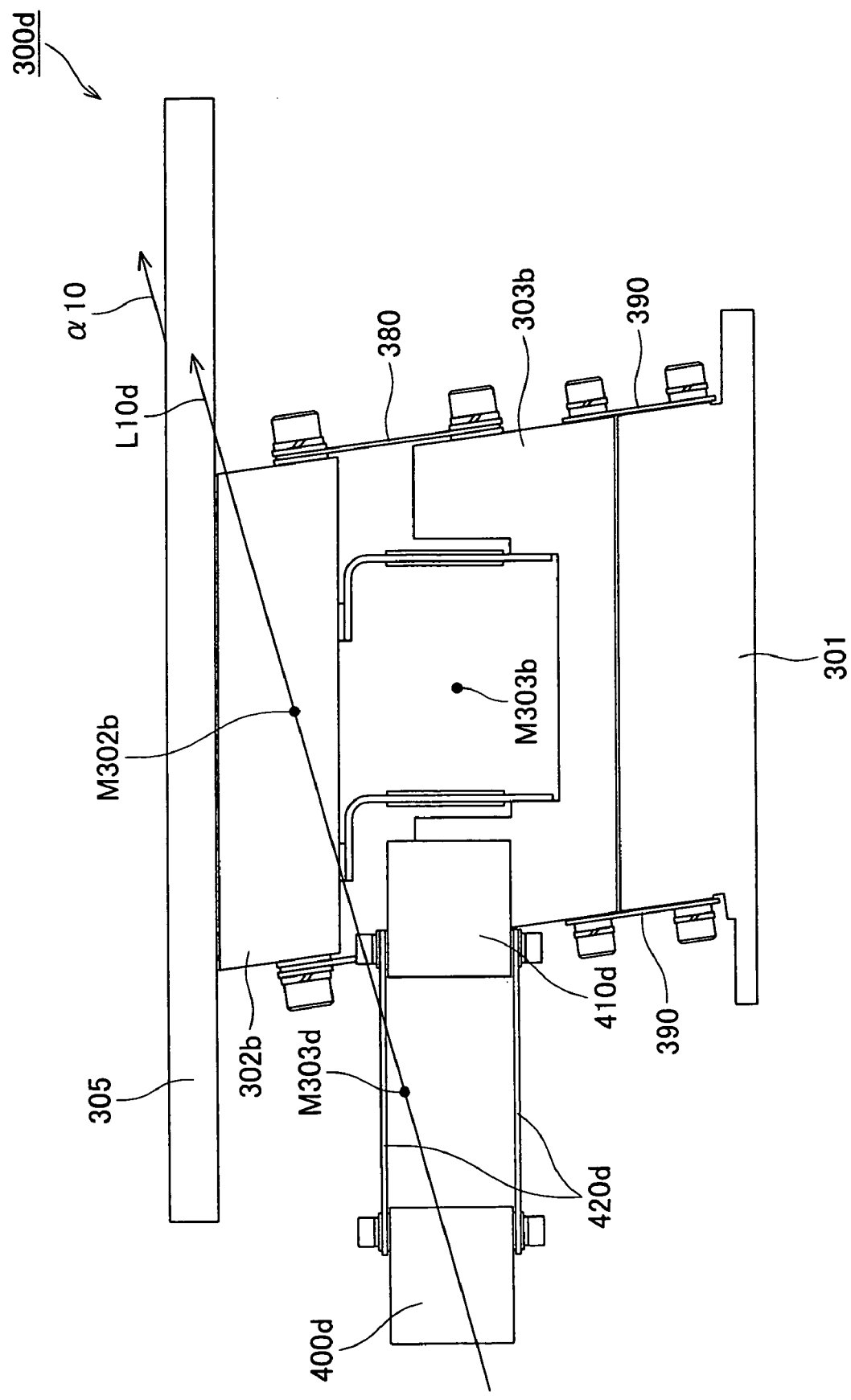
FIG. 9 is a view illustrating an example of a piezo-driven parts feeder according to a fifth embodiment.

Hereinafter, a piezo-driven parts feeder 300d according to a fifth embodiment will be described. FIG. 9 is a view illustrating an example of the piezo-driven parts feeder 300d according to the fifth embodiment.

A difference between the piezo-driven parts feeder 300d according to the fifth embodiment and the piezo-driven parts feeder 300b according to the third embodiment is as follows.

The piezo-driven parts feeder 300d includes a spindle 400d, a pair of elasticity members 420d, and an attachment member 410d, instead of the spindle 400b and the connection board 370b according to the third embodiment.

As illustrated in FIG. 9, the attachment member 410d is arranged on the weight part 303b, the pair of elasticity members 420*d* extends from the both ends of the attachment member to the lateral side thereof, and the spindle 400*d* is arranged at the front ends of the elasticity members 420*d*.

In this case, even when the pitching phenomenon is generated, since the spindle 400*d* performs a pendulum operation through the elasticity members 420*d* in the opposite phase of the pitching phenomenon, the pitching phenomenon can be canceled.

In addition, a barycentric position of the weight part 303*b* can be changed to a total barycentric position M303*d* of the spindle 400*d* and the weight part 303*b*.

As a result, it is possible to equalize a straight line L10*d* which connects the total barycentric position M303*d* of the spindle 400*d* and the weight part 303*b* with a barycentric position M302*b* of the carriage way 305 and the piezoelectric vibration part 302*b* to the carriage angle α10 of the part. Accordingly, it is possible to prevent the pitching phenomenon and to smoothly convey the part.

Moreover, it is possible to reduce the vibration transmitted to the base part 301 and to reduce the mass of the base part 301. As a result, it is possible to suppress the vibration from being transmitted to the lower side of the piezo-driven parts feeder 300*d*.

(Sixth Embodiment)

Figure 10:
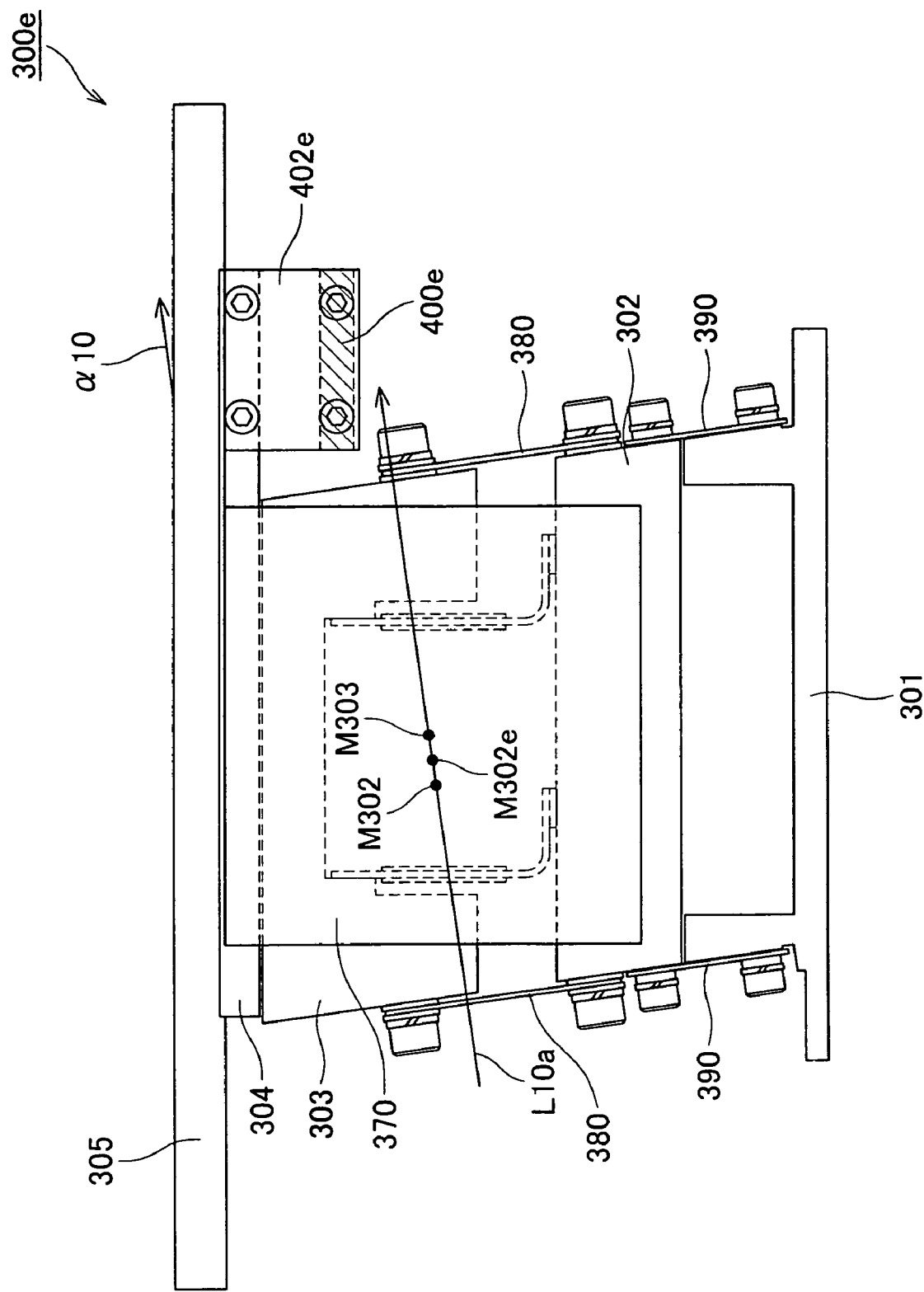
FIG. 10 is a view illustrating an example of a piezo-driven parts feeder according to a sixth embodiment.

Hereinafter, a piezo-driven parts feeder 300*e* according to a sixth embodiment will be described. FIG. 10 is a view illustrating an example of the piezo-driven parts feeder 300*e* according to the sixth embodiment.

A difference between the piezo-driven parts feeder 300*e* according to the sixth embodiment and the piezo-driven parts feeder 300 according to the first embodiment is as follows.

In the piezo-driven parts feeder 300*e*, a spindle 400*e* and a pair of connection members 402*e* are provided in the vibration transmission part 304, instead of the spindle 400 and the pair of elasticity members 402 provided on the piezoelectric vibration part 302 according to the first embodiment.

In particular, a plurality of screw holes for attaching the pair of elasticity members 402*e* is provided in the end of the vibration transmission part 304 of the piezo-driven parts feeder 300*e* and the pair of elasticity members 402*e* is fixed to the screw holes disposed at optimal positions by screws. In addition, the spindle 400*e* is provided with screw holes for attaching the pair of elasticity members 402*e* and the spindle 400*e* is fixed to the screw holes disposed at optimal positions by screws.

As mentioned above, in the piezo-driven parts feeder 300*e* according to the sixth embodiment, since the piezoelectric vibration part 302 and the vibration transmission part 304 are separated from each other through the weight part 303 in the vertical direction, a total barycentric position M302 of the piezoelectric vibration part 302, the vibration transmission part 304, and the carriage way 305 can be close to a barycentric position M303 of the weight part 303. As a result, it is possible to equalize the straight line L10*a* which connects the barycentric position M302*e* with the barycentric position M303 to the angle α10 for applying the vibration to the part.

In addition, it is possible to reduce the vibration transmitted to the base part 301 and to reduce the mass of the base part 301. As a result, it is possible to suppress the vibration from being transmitted to the lower side of the piezo-driven parts feeder 300*e*.

Furthermore, although, in the present embodiment, the vibration transmission part 304 and the carriage way 305 are separated from each other in a configuration of a first drive part and a second drive part, the present invention is not limited to this, and the vibration transmission member 304 and the carriage way 305 may be integrally formed. Moreover, although, in the present embodiment, the weight part is used, the present invention is not limited to this, and a vibration spindle and a balance weight may be included.

(Seventh Embodiment)

Figure 11:
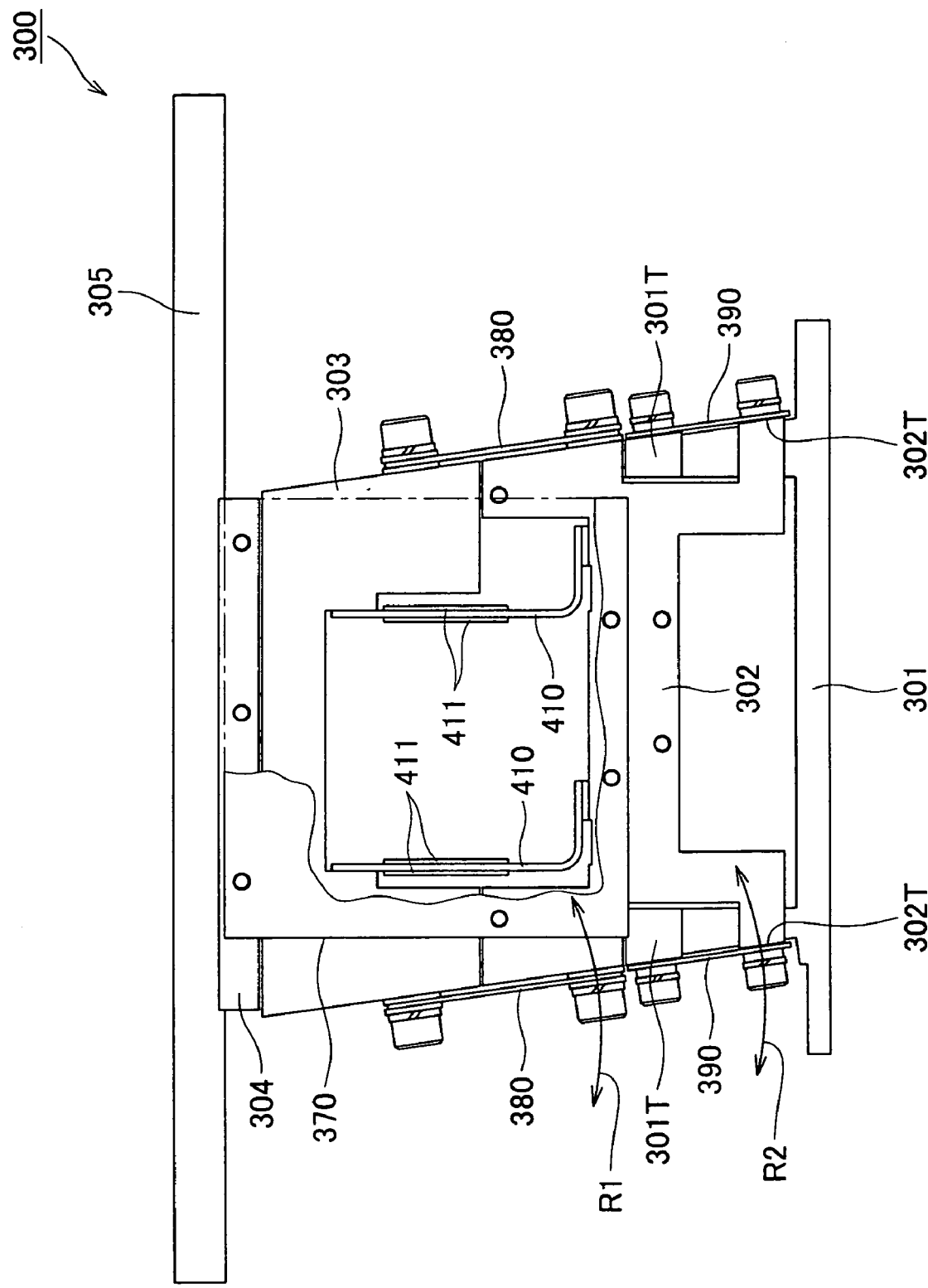
FIG. 11 is a side view illustrating an example of a piezo-driven parts feeder according to a seventh embodiment of the present invention.
Figure 12:
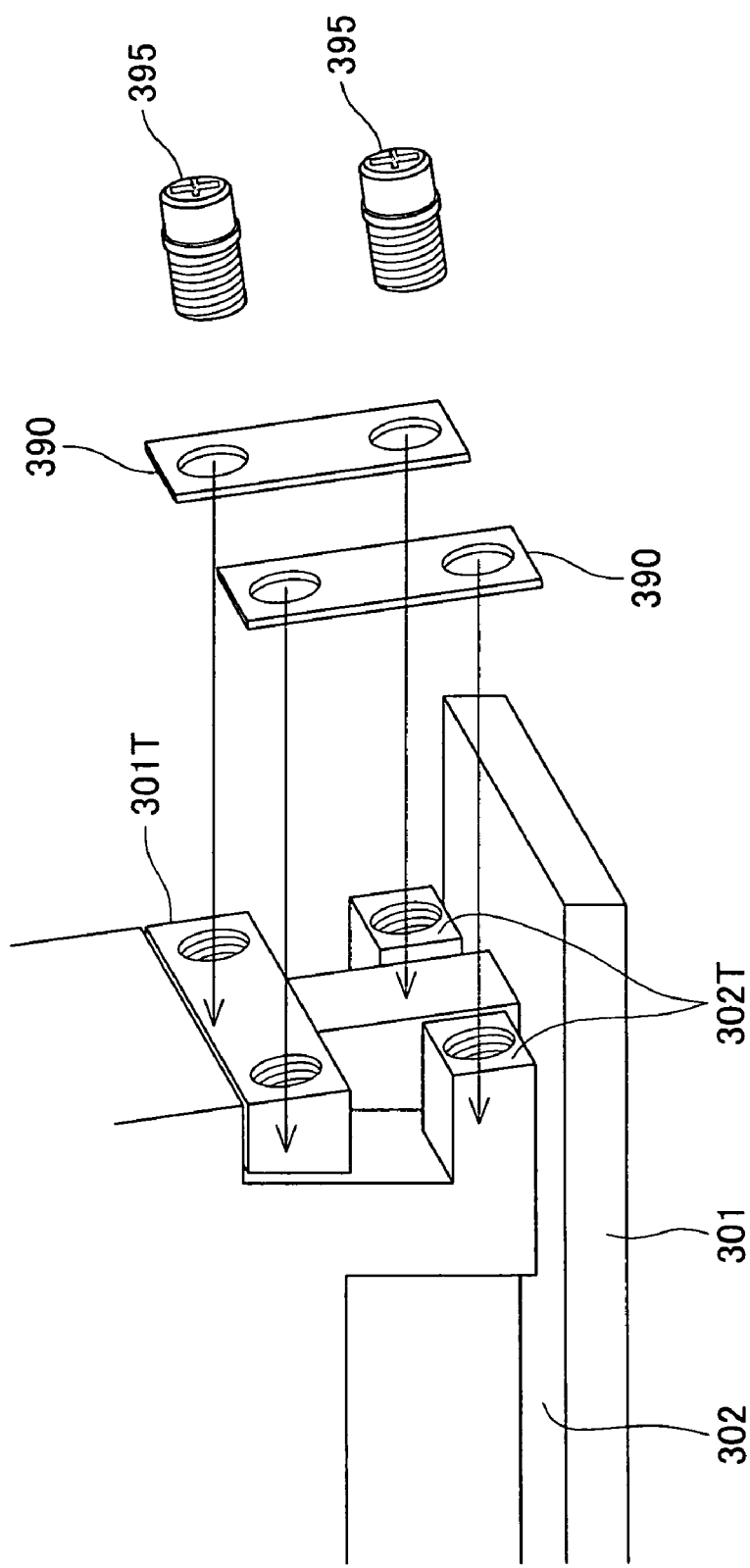
FIG. 12 is an enlarged perspective view illustrating a portion of the parts feeder according to the seventh embodiment.

FIG. 11 is a side view illustrating an example of a piezo-driven parts feeder 300 according to a seventh embodiment of the present invention. FIG. 12 is an enlarged perspective view illustrating a portion of the piezo-driven parts feeder 300 according to the seventh embodiment of the present invention.

As illustrated in FIG. 11, the piezo-driven parts feeder 300 includes a base part 301, a piezoelectric vibration part 302, a weight part 303, a vibration transmission part 304, a carriage way 305, a connection board 370, a board spring 380, and a vibration prevention leaf spring 390.

As illustrated in FIG. 11, the piezoelectric vibration part 302 is provided above the base part 301. The weight part 303 is provided above the piezoelectric vibration part 302 through the board spring 380. Here, as illustrated in FIGS. 11 and 12, a pair of T-bar parts 301T is provided above the left and right ends of the base part 301 of the piezo-driven parts feeder 300 according to the present embodiment, and two protrusion members 302T are provided below the left and right ends of the piezoelectric vibration part 302.

As illustrated in FIG. 12, two screw holes are formed in the T-bar part 301T. In addition, the two protrusion members 302T are arranged to insert a root of the T-bar part 301T therebetween, and one screw hole is formed in the protrusion member 302T. One end of the vibration prevention leaf spring 390 is fixed to one screw hole of the T-bar part 301 by a bolt 395 and the other end of the vibration prevention leaf spring 390 is fixed to one screw hole of the protrusion member 302T by a bolt 395. In addition, one end of the vibration prevention leaf spring 390 is fixed to the other screw hole of the T-bar part 301 by a bolt 395 and the other end of the vibration prevention leaf spring 390 is fixed to the other screw hole of the protrusion member 302T by a bolt 395 (not illustrated). By this configuration, on the base part 301, the protrusion members 302T can be suspended downward by both T-bar parts 301T.

In addition, although, in the present embodiment, the numbers of the protrusion members 302T and the T-bar members 301T are two, the present invention is not limited to this, and the numbers of the protrusion members 302T and the T-bar members 301T may be changed to any value.

Furthermore, as illustrated in FIG. 11, an L-shaped elasticity member 410 formed by bending a flat plate is provided in the piezoelectric vibration part 302 and the weight part 303. One end of the elasticity member 410 is fixed to the weight part 303 and the other end thereof is fixed to piezoelectric vibration part 302.

Moreover, piezoelectric elements 411 are arranged on the both surfaces of the elasticity member 410. A spring constant composed of the elasticity member 410 and the piezoelectric elements 411 is adequately selected depending on any resonance frequency condition determined by the size and the weight of a conveyed part and the weight of the carriage way 305.

In the piezoelectric elements 411 of FIG. 11, piezoelectric ceramic is subjected to a polarization process, the piezoelectric ceramic having a plus polarization potential is attached to one surface of the elasticity member 410 and the piezoelectric ceramic having a minus polarization potential is attached to the other surface of the elasticity member 410.

To this end, a bimorph structure is formed on the front and rear surfaces of the elasticity member 410 by the piezoelectric elements 411. Vibration is generated by applying charges to the piezoelectric elements 411 and thus the weight part 303 and the piezoelectric vibration part 302 vibrate in opposite directions.

Subsequently, the vibration transmission part 304 is provided above the weight part 303. The vibration transmission part 304 is fixed by the connection board 370 connected to the piezoelectric vibration part 302. In other words, the vibration transmission part 304 moves in synchronization with the vibration of the piezoelectric vibration part 302. Furthermore, the carriage way 305 is provided above the vibration transmission part 304. By applying the vibration to the carriage way 305, a part moves in a carriage hole provided in the carriage way 305.

As mentioned above, in the piezo-driven parts feeder 300 according to the present embodiment, since the protrusion members 302T are suspended downward by the T-bar parts 301T using the vibration prevention leaf spring 390, the protrusion members 302T can vibrate in a direction indicated by an arrow R2 illustrated in FIG. 11. In addition, the board spring 380 for connecting the weight part 303 with the piezoelectric vibration part 302 can vibrate in a direction indicated by an arrow R1 illustrated in FIG. 11, because the lower end of the weight part 303 suspends the upper end of the piezoelectric vibration part 302 through the board spring 380 downward.

Accordingly, since it is possible to equalize the vibration directions of the vibration prevention leaf spring 390 and the board spring 380 to each other, stable vibration is applied to the carriage way 305 and to smoothly convey the part.

Furthermore, since the piezoelectric vibration part 302 and the vibration transmission part 304 are separated from each other in a vertical direction, a total barycentric position which is a sum of a barycentric position of the piezoelectric vibration part 302, a barycentric position of the vibration transmission part 304, and a barycentric position of the carriage way 305 can be close to the barycentric position of the weight part 303 and thus a straight line for connecting the barycentric positions with each other can be easily equalized to an angle for applying vibration to the part. As a result, it is possible to prevent the so-called pitching phenomenon and to smoothly convey the part. In addition, it is possible to suppress the vibration from being applied to the lower side of the part carriage device.

(Eighth Embodiment)

Figure 13:
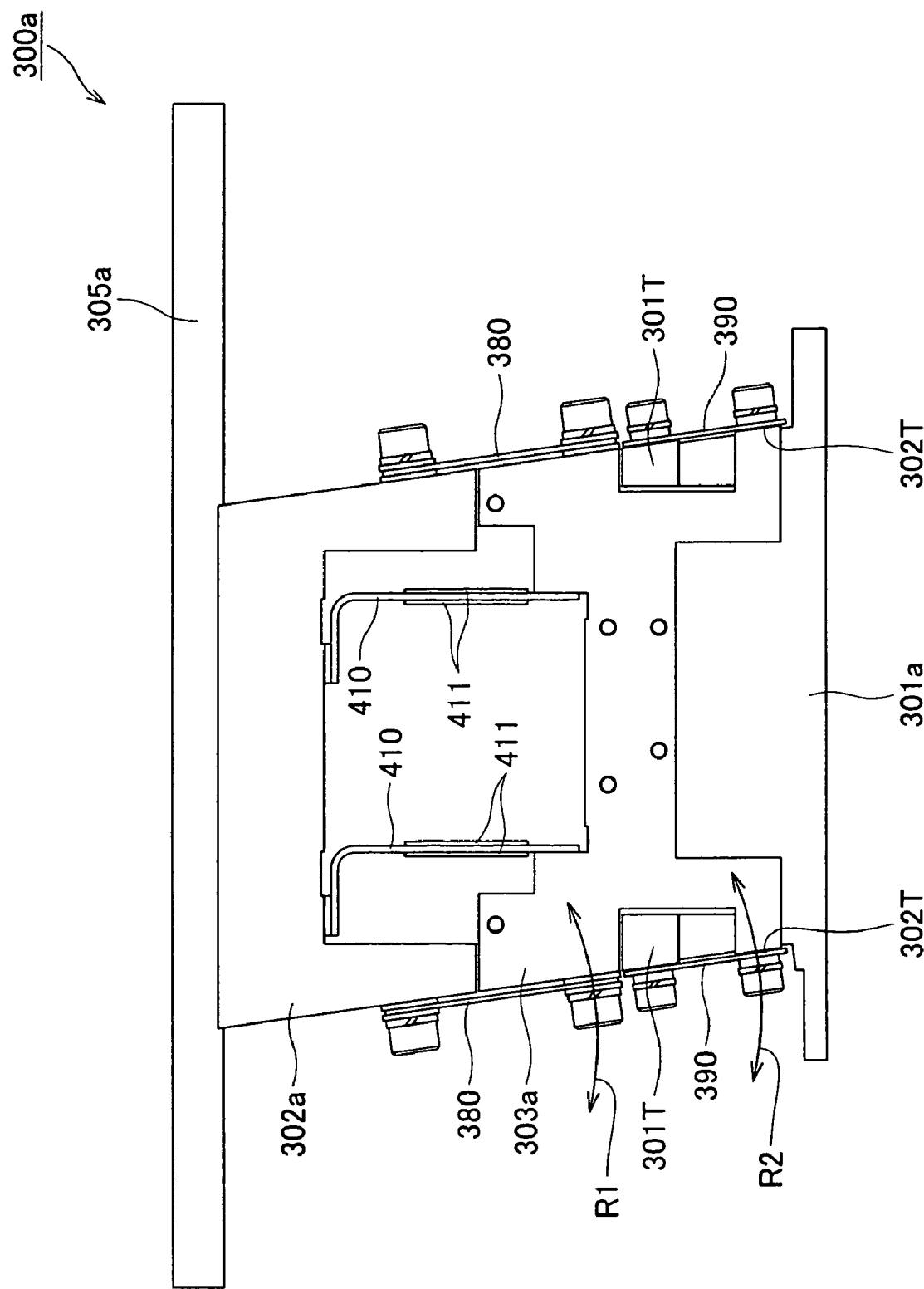
FIG. 13 is a side view illustrating an example of a piezo-driven parts feeder according to an eighth embodiment.
Figure 14:
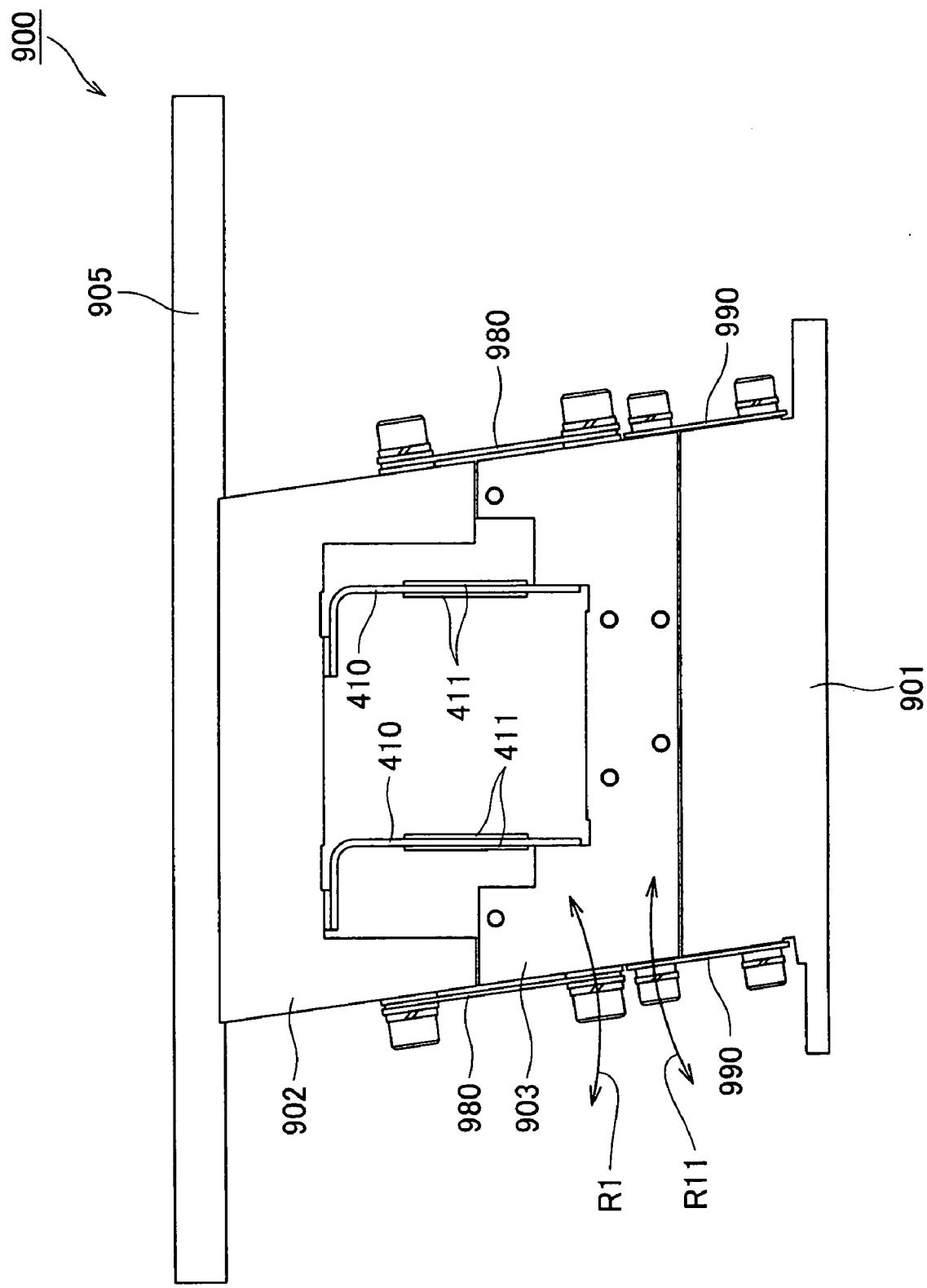
FIG. 14 is a view illustrating a vibration direction of a board spring and a vibration direction of a vibration prevention leaf spring of a conventional parts feeder.

Next, an eighth embodiment of the present invention will be described. FIG. 13 is a side view illustrating an example of a piezo-driven parts feeder 300a according to the eighth embodiment.

As illustrated in FIG. 13, the piezo-driven parts feeder 300a includes a base part 301a, a piezoelectric vibration part 302a, a weight part 303a, a carriage way 305a, a board spring 380a, and a vibration prevention leaf spring 390a.

The weight part 303a is provided above the base part 301a. Here, similar to the seventh embodiment, a pair of T-bar parts 301T illustrated in FIG. 12 is provided above the left and right ends of the base part 301a of the piezo-driven parts feeder 300a according to the eighth embodiment. In addition, instead of the two protrusion members 302T of the piezoelectric vibration part 302 illustrated in FIG. 12, two protrusion members 303T are provided below the left and right ends of the weight part 303a.

Similar to the seventh embodiment, the T-bar parts 301T provided at the left and right ends of the base part 301a can suspend the protrusion members 303T downward by the vibration prevention leaf spring 390a.

Furthermore, similar to FIG. 11, as illustrated in FIG. 13, an L-shaped elasticity member 410 formed by bending a flat plate is provided in the piezoelectric vibration part 302a and the weight part 303a. One end of the elasticity member 410 is fixed to the weight part 303a and the other end thereof is fixed to piezoelectric vibration part 302a.

Moreover, piezoelectric elements 411 are arranged on the both surfaces of the elasticity member 410. A spring constant composed of the elasticity member 410 and the piezoelectric elements 411 is adequately selected depending on any resonance frequency condition determined by the size and the weight of a conveyed part and the weight of the carriage way 305a.

In the piezoelectric elements 411 of FIG. 13, piezoelectric ceramic is subjected to a polarization process, the piezoelectric ceramic having a plus polarization potential is attached to one surface of the elasticity member 410 and the piezoelectric ceramic having a minus polarization potential is attached to the other surface of the elasticity member 410. To this end, a bimorph structure is formed on the front and rear surfaces of the elasticity member 410 by the piezoelectric elements 411. Vibration is generated by applying charges to the piezoelectric element 411 and thus the weight part 303a and the piezoelectric vibration part 302a vibrate.

Subsequently, the carriage way 305a is provided above the piezoelectric vibration part 302a. By applying the vibration to the carriage way 305a, a part moves in a carriage hole provided in the carriage way 305a.

As mentioned above, in the piezo-driven parts feeder 300a according to the present embodiment, since the protrusion members 303T are suspended downward by the T-bar parts 301T using the vibration prevention leaf spring 390a, the protrusion members 302T can vibrate in a direction indicated by an arrow R2 illustrated in FIG. 13. In addition, the board spring 380a for connecting the weight part 303a with the piezoelectric vibration part 302a can vibrate in a direction indicated by an arrow R1 illustrated in FIG. 13, because the lower end of the weight part 303a suspends by the upper end of the piezoelectric vibration part 302a through the board spring 380a downward. Accordingly, the vibration directions of the vibration prevention leaf spring 390a and the board spring 380a can be equalized to each other. As a result, stable vibration is conveyed to the carriage way 305a and thus a part can be smoothly conveyed.

In the above-mentioned embodiments, the elasticity member 410 and the piezoelectric element 411 correspond to a vibration body, the base part corresponds to a base part, the vibration prevention leaf spring 390 corresponds to a vibration prevention member, the piezoelectric vibration part 302 corresponds to a first drive part, the board spring 380 corresponds to a support member, the weight part 303 corresponds to a weight part, a connection board 370 corresponds to a connection member, the vibration transmission part 304 corresponds to a second drive part, the carriage way 305 corresponds to a carriage way, the carriage angle α10 corresponds to an angle for applying vibration to a part, the spindles 400c and 400d, the pair of elasticity members 420c and 420d, and the attachment members 410c and 410d correspond to a weight adjustment part, the weight parts 303c and 303d correspond to a first weight part, the piezoelectric vibration part 302b corresponds to a drive part, and the spindles 400c and 400d correspond to a second weight part.

In the seventh and eighth embodiments, the piezo-driven parts feeder 300 and 300a correspond to a part carriage device, the base parts 301 and 301a correspond to a base part, the vibration prevention leaf springs 390 and 390a correspond to a vibration prevention member, the protrusion member 302T and 303T correspond to the lower end of a vibration exciter, the T-bar part 301T corresponds to the upper end of the base part, the piezoelectric vibration part 302 corresponds to a first drive part, the board springs 380 and 380a correspond to a support member, the piezoelectric element 411 and the elasticity member 410 correspond to a vibration body, the weight parts 303 and 303a correspond to a weight part, the connection board 370 corresponds to a connection member, the vibration transmission part 304 corresponds to a second drive part, the carriage way 305 corresponds to a carriage way, and the piezoelectric vibration part 302a corresponds to a drive part.

Although the present invention is described with reference to the exemplary first to sixth embodiments, the present invention is not limited to these embodiments. It will be understood by those skilled in the art that various embodiment may be realized therein without departing from the spirit and scope of the present invention. For example, the present invention can apply to a bowl feeder. In addition, although, in the present embodiment, the operation and the effect according to the configuration of the present invention are described, the operation and the effect are exemplary and do not limit the present invention.

Although the present invention is described with reference to the exemplary seventh and eighth embodiments, the present invention is not limited to these embodiments. It will be understood by those skilled in the art that various embodiments may be realized therein without departing from the spirit and scope of the present invention. In addition, although, in the present embodiment, the operation and the effect according to the configuration of the present invention are described, the operation and the effect are exemplary and do not limit the present invention.

What is claimed is:

1. A part carriage device for applying vibration generated at a vibration body to a part and linearly conveying the part, comprising:
    a base part which is disposed at a lowest side of the part carriage device;
    a first drive part which is arranged above the base part through a vibration prevention member;
    a weight part which is arranged above the first drive part through a support member and the vibration body;
    a second drive part which is arranged above the weight part through a connection member connected to the first drive part; and
    a carriage way which is arranged above the second drive part and conveys the part in a horizontal direction,
    wherein a straight line for connecting a total barycentric position, which is a sum of a barycentric position of the first drive part, a barycentric position of the second drive part, and a barycentric position of the carriage way, with a barycentric position of the weight part is approximately in parallel to an angle for applying the vibration to the part.

2. The device according to claim 1, wherein the first drive part further comprises a weight adjustment part which can change the barycentric position of the first drive part.

3. The device according to claim 1, wherein the second drive part further comprises a weight adjustment part which can change the barycentric position of the second drive part.

4. The device according to claim 1, wherein a rigidity value of the vibration prevention member is smaller than that of the support member.

5. A part carriage device for applying vibration generated at a vibration body to a part and linearly conveying the part, comprising:
    a base part which is disposed at a lowest side of the part carriage device;
    a first weight part which is arranged above the base part through a vibration prevention member;
    a drive part which is arranged above the first weight part through a support member and the vibration body;
    a second weight part which is arranged through a connection member connected to the first weight part; and
    a carriage way which conveys the part in a horizontal direction,
    wherein a straight line for connecting a total barycentric position which is a sum of a barycentric position of the first weight part and a barycentric position of the second weight part with a total barycentric position which is a sum of a barycentric position of the drive part and a barycentric position of the carriage way is approximately in parallel to an angle for applying the vibration to the part.

6. The device according to claim 5, wherein the second weight part is provided above the carriage way.

7. The device according to claim 5, wherein the second weight part is provided at the lateral side of the first weight part.

8. The device according to claim 5, wherein a rigidity value of the vibration prevention member is smaller than that of the support member.

9. A part carriage device for applying vibration generated at a vibration body to a part and linearly conveying the part, comprising:
    a base part which is disposed at a lowest side of the part carriage device; and
    a vibration exciter which is arranged above the base part through a vibration prevention member,
    the vibration exciter further comprising:
    a first drive part which is arranged above the base part through the vibration prevention member;
    a weight part which is arranged above the first drive part through a support member and the vibration body;
    a second drive part which is arranged above the weight part through a connection member connected to the first drive part; and
    a carriage way which is arranged above the second drive part and conveys the part in a horizontal direction,
    wherein the lower end of the first drive part is suspended downward by the upper end of the base part using the vibration prevention member, and the upper end of the first drive part is suspended downward by the lower end of the weight part using the support member.

10. A part carriage device for applying vibration generated at a vibration body to a part and linearly conveying the part, comprising:
    a base part which is disposed at a lowest side of the part carriage device; and
    a vibration exciter which is arranged above the base part through a vibration prevention member,
    the vibration exciter further comprising:
    a weight part; and
    a drive part which is arranged above the weight part through a support member and the vibration body,
    wherein the upper end of the weight part is suspended downward by the lower end of the drive part using the support member, and the lower end of the weight part is suspended downward by the upper end of the base part using the vibration prevention member.

* * * * *